United States Patent [19]

Hashimoto et al.

[11] 4,232,956
[45] Nov. 11, 1980

[54] DATA RECORDABLE CAMERA

[75] Inventors: Akihiko Hashimoto, Hachioji; Tamotsu Koiwai, Akikawa, both of Japan

[73] Assignee: Olympus Optical Co., Ltd., Tokyo, Japan

[21] Appl. No.: 80,160

[22] Filed: Sep. 28, 1979

[30] Foreign Application Priority Data

Oct. 3, 1978 [JP] Japan .................. 53-121833

[51] Int. Cl.³ .......................................... G03B 17/24
[52] U.S. Cl. ..................................... 354/106; 354/173
[58] Field of Search .............. 354/105, 106, 109, 173; 352/121, 84

[56] References Cited

U.S. PATENT DOCUMENTS

| 3,827,070 | 7/1974 | Hoerenz et al. | 354/105 |
| 3,854,142 | 12/1974 | Whitley et al. | 354/173 |
| 3,953,868 | 4/1976 | Kawamura et al. | 354/109 |
| 4,096,500 | 6/1978 | Lermann et al. | 354/173 |

FOREIGN PATENT DOCUMENTS 2654259  6/1977 Fed. Rep. of Germany .......... 354/105

Primary Examiner—John Gonzales

[57] ABSTRACT

A data recordable camera is provided with a timer circuit for providing a time data and a timing data, a data recording unit for converting the time data from the timer circuit into an optical image to expose a film, and data display unit for displaying the time data. The timing data is transferred to a motor drive device to determine the operation timing of the motor drive device.

7 Claims, 21 Drawing Figures

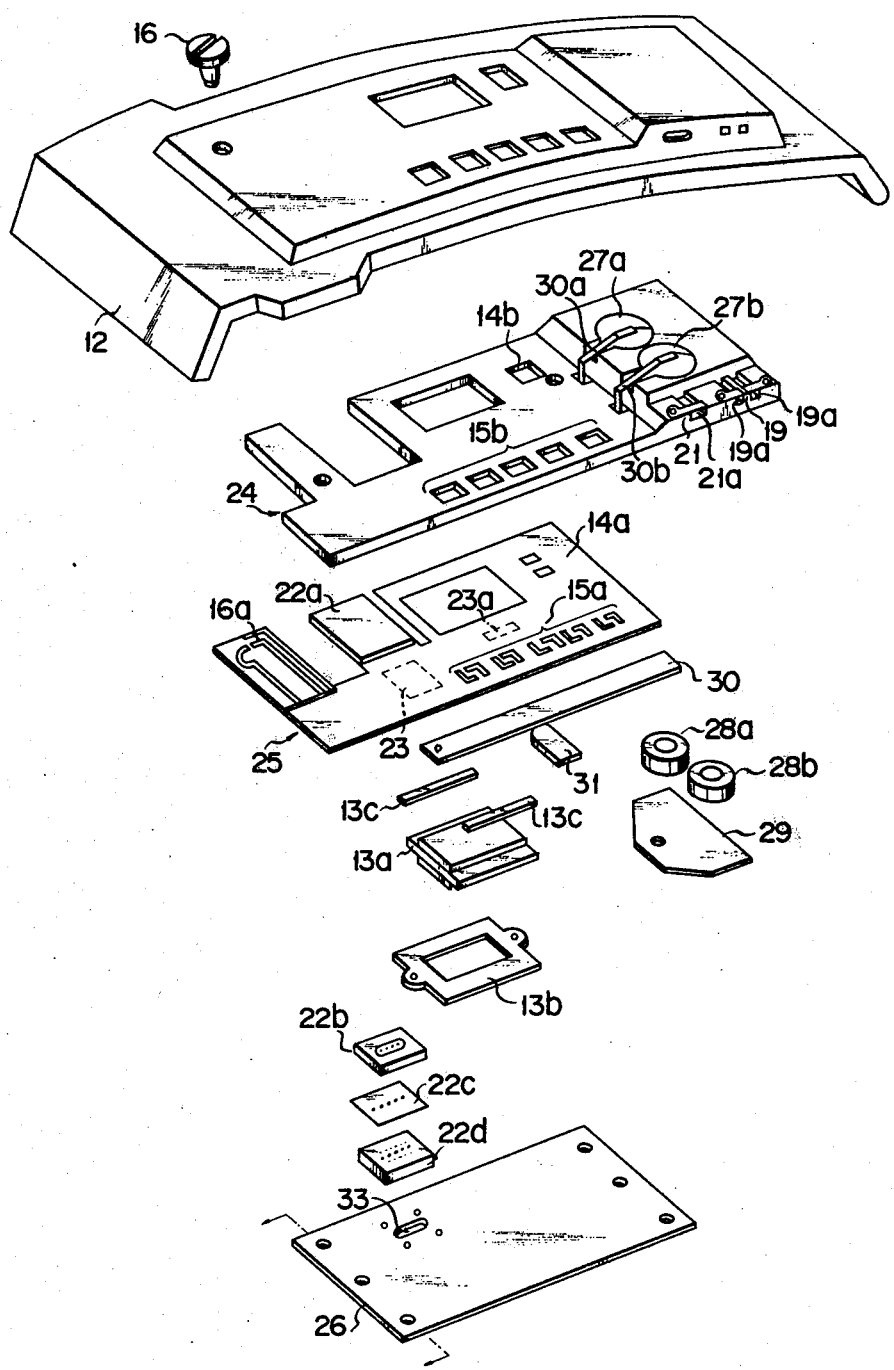

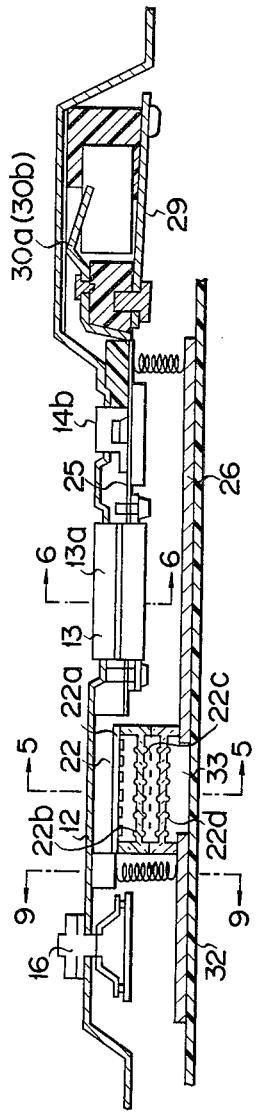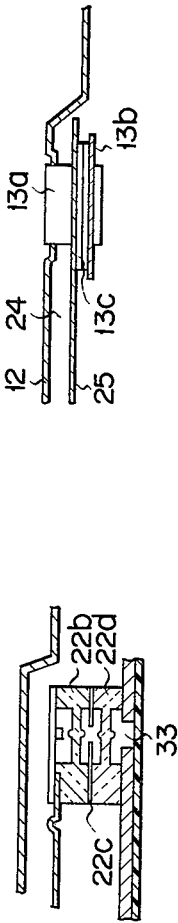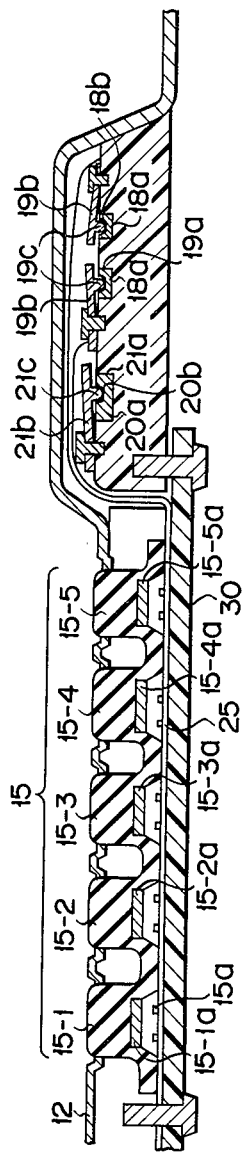

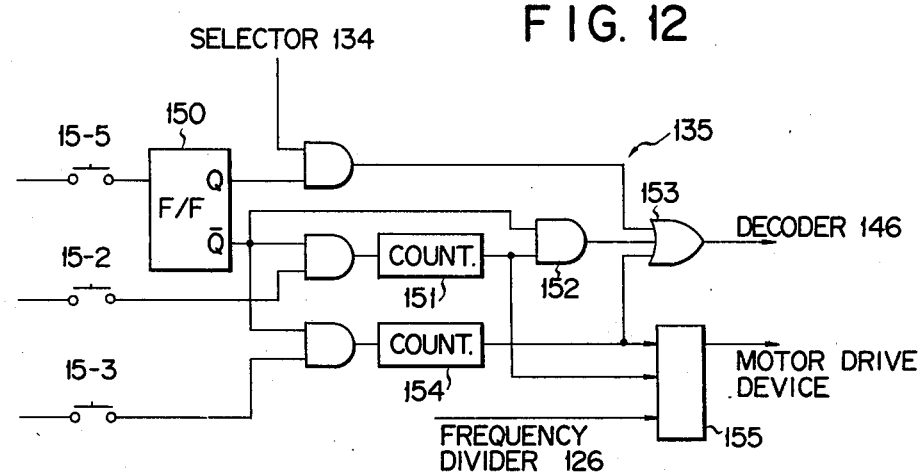
FIG. 12
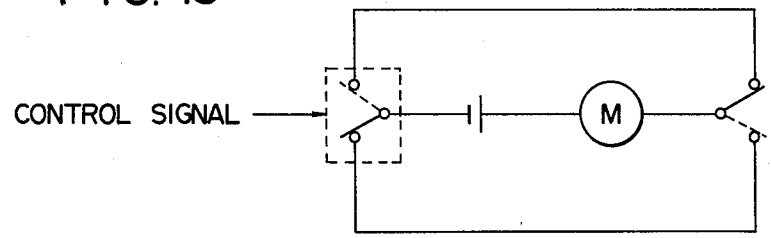
FIG. 13
FIG. 15
FIG. 16
FIG. 17
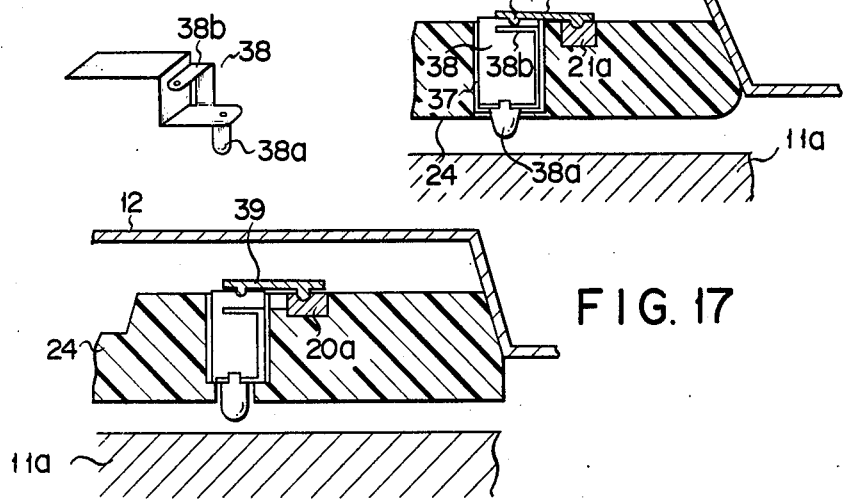

DATA RECORDABLE CAMERA

BACKGROUND OF THE INVENTION

The present invention relates to a camera capable of recording various data on a film and, more particularly, the data recording camera into which a motor drive device may be loaded.

There have been conventional cameras with data recording capability that can record or place on a film date data such as day, month and year. These cameras of this type have a built-in timer circuit of IC that sends a data signal to light-emitting segments via a decoder/driver, so that the data corresponding to the data is recorded on a film. In those cameras, the data from the timer circuit is used only for the purpose of photographing the data on the film and indicating the data thus photographed for check purpose.

SUMMARY OF THE INVENTION

Accordingly, an object of the invention is to provide a data recordable camera in which the output data produced from a data producing circuit provided in a camera body is used for other purposes than the data recording and display.

According to the invention, there is provided a data recordable camera, data from which is used for a driving control of a motor drive device.

Other objects and features of the invention will be apparent from the following description taken in connection with the accompanying drawings, in which:

BRIEF DESCRIPTION OF THE DRAWINGS

FIG. 3 shows an exploded view of a back cover assembly of the camera;

FIG. 4 shows a cross sectional view of the back cover assembly;

FIG. 5 shows a cross sectional view of a data recording unit used in the camera;

FIG. 6 shows a cross sectional view of a recorded data display unit;

FIG. 7 shows a cross sectional view of a group of push buttons for control and a socket used in the camera;

FIGS. 11 and 12 are block circuit diagrams illustrating the details of the circuit shown in FIG. 10;

FIG. 13 shows a block circuit diagram of a motor drive device;

FIGS. 14 to 18 show various states of the synchronization socket; and

DETAILED DESCRIPTION OF THE PREFERRED EMBODIMENTS

Figure 1:
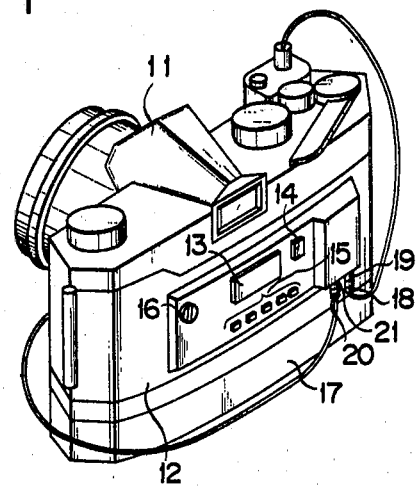
FIG. 1 shows a perspective view of a data recordable camera for data recording which is an embodiment of the invention.
Figure 2:
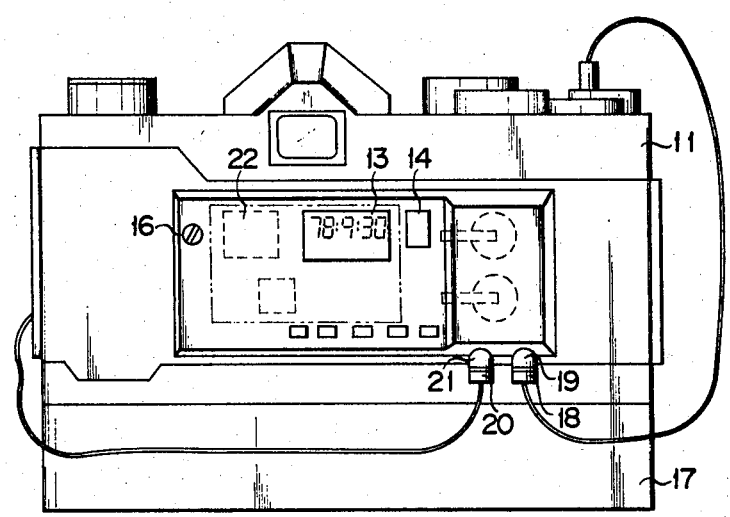
FIG. 2 shows a rear view of the camera shown in FIG. 1.

As shown in FIG. 1 and FIG. 2, a back cover 12 of a data recordable camera 11 mounted on a motor drive device is provided with an optically placed data display unit 13 and the data mode switch button 14. The data mode switch button is intended to select a year-month-day mode, an hour-minute-second mode or a no-data-recording mode. The data to be photographed on a film can be adjusted by manipulating a group of pushbuttons 15. There is an ASA sensitivity switch button 16 on the back cover 12. A motor drive control plug 18 of the motor drive device 17 mounted on the camera 11 is inserted into a motor drive control socket 19 on the right half of the back cover 12. A synchroflash plug 20 is inserted into a synchronization socket 21. As shown in FIG. 2, there are a light-emitting unit 22 for photographing data on a film and a large scale integrated circuit on the inside of the back cover 12. The large scale integrated circuit 23, i.e. LSI, comprises a timer circuit to produce data such as year, month, and day or hour, minute, and second, and a decoder/driver circuit.

FIG. 3 is an exploded view of the construction comprising the optical data recording unit and the data display unit mounted on the back cover 12 of the camera. As shown in the FIG. 3, a base board 24, a flexible printed board 25 and a pressure plate 26 are mounted on the back cover 12 in this order. The LSI 23 and a quartz oscillator 23a are mounted on the flexible printed board 25 with proper wiring to each other. Also on the flexible printed board are provided the optical data recording unit 22 and the data display unit 13. The optical data recording unit 22 comprises a light-emitting diode base 22a, a lens 22b, an aperture control 22c and a lens 22d. The data display unit 13 comprises a liquid-crystal display device 13a that is fastened to the base board 24 by a fitting frame 13b with elastic pieces such as connecting members 13c located between the display device 13a and the fitting frame 13b. Mercury batteries 28a and 28b or the like are placed in battery cavities 27a and 27b of the base board 24. These batteries are held fast between a metal plate 29 and contact pieces 30a and 30b. The metal plate 29 is so detachable that it is removed when the batteries are replaced. A printed circuit 14a on the flexible printed board 25 is so located as to face an opening 14b where the data mode switch button 14 comes in for mounting (see FIGS. 1 and 2). The printed circuit group 15a is so located as to face a group of openings 15b where a group of pushbuttons 15 comes in for mounting (see FIGS. 1 and 2). A printed circuit 16a is located to meet the ASA sensitivity switch button 16. The flexible printed board 25 with above-mentioned various parts attached thereto is reinforced by support members 30 and 31.

FIG. 4 shows a cross-sectional view of the back cover assembly in which the component parts shown in FIG. 3 are incorporated, crossing the display unit and light-emitted unit. As shown, a pressure plate 26 presses a film 32 to hold it flat and the optical image from the optical data recording unit 22 coming through an opening 33 of the pressure plate 26 is focused on the film 32. FIG. 5 shows a cross section of the optical data recording unit 22 when it is cut along line 5—5 in FIG. 4. Light-emitting diodes to form a 7-segment display are arrayed on the light-emitting diode base 22a of the optical data recording unit 22. A desired optical image is obtained when certain segments of light-emitting diodes are selected to be actuated by the signals based on the data from the LSI. FIG. 6 shows a cross section of the data display unit 13 taken along the line 6—6 in FIG. 4. The liquid-crystal display device 13a of the data display unit 13 is so controlled by the data from the LSI as to indicate the same data as the recording data. FIG. 7 shows a cross section of the back cover assembly, crossing the pushbutton group 15. The pushbutton group 15 comprises five pushbuttons 15-1 through 15-5. These pushbuttons are integrally formed of elastic insulator such as rubber. Conductive members 15-1a, 15-2a, 15-3a, 15-4a and 15-5a made of metal such as copper are located at the bottom of these pushbuttons, so that when each of the pushbuttons is depressed or released the respective conductive member touches or leaves the printed contact points on the flexible printed board 25 making or breaking the circuit.

Figure 8:
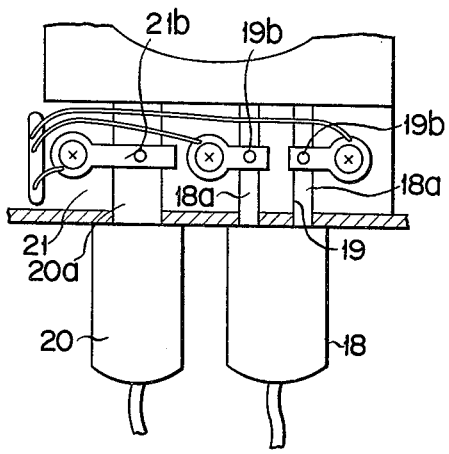
FIG. 8 shows a plan view of a synchroflash contact and motor drive control sockets into which a synchroflash plug and a motor drive control plug are inserted.

FIG. 8 shows the motor drive control plug 18 and the synchroflash plug 20 inserted into the motor drive control terminal socket 19 and the synchroflash socket 21, respectively. The sockets 19 and 21 comprise elastic contact pieces 19b and 21b extended into socket grooves 19a and 21a of the base board 24, respectively. When the plugs 18 and 20 are inserted into the socket grooves 19a and 21a, the plugs 18 and 20 are connected with the contact pieces 19b and 21b, respectively. In order to prevent the plugs 18 and 20 from undesirably coming off the sockets 19 and 21, conductive pins 18a and 20a of the plugs 18 and 20 are provided with dimples 18b and 20b which engage in the protrusions 19c and 21c of the elastic contact pieces 19b and 21b as they press the conductive pins when the plugs are inserted into the sockets.

Figure 9:
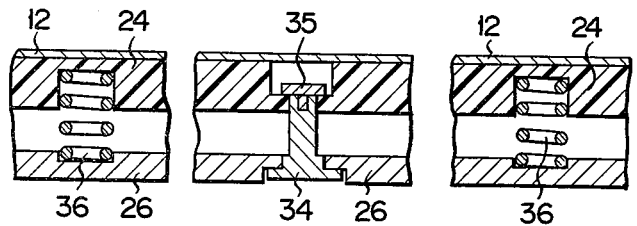
FIG. 9 shows a cross sectional view of a pressure plate attached to the back cover.

FIG. 9 shows a cross section of the back cover assembly taken along line 9—9 in FIG. 4. In this figure, the pressure plate 26 is fastened to the base board 24 mounted on the back cover 12 by a stud 34 and a screw 35 which has threaded fitting with the stud. There are springs between the pressure plate 26 and the base board 24, so that the pressure plate 26 has elastic support provided by the springs 36.

The operation of the data recordable camera thus constructed will be described with reference to a block circuit diagram shown in FIG. 10. When a power supply of the camera is turned on, the circuit of the camera, in particular the LSI 23 including the timer circuit, is actuated. At this stage, the mode switch button 14 is operated to select one of the three; year-month-day recording; hour-minute-second recording or no-data-recording mode. If the year-month-day mode is selected and "77:8:25" is indicated on the liquid-crystal display device 13a, then the first depressing of the pushbutton 15-1 will make the "77" indicating the year blink. In this state, when the pushbutton 15-2 is depressed the "77" on display can be changed to "78." When the pushbutton 15-1 is depressed again, "8" indicating the month will blink. The "8" can be changed to "9" by depressing the pushbutton 15-3 once. When the pushbutton 15-1 is depressed once more or the third time, "25" indicating the day will blink. The "25" can be changed to "26" by depressing the pushbutton 15-4 once. By such way, when the year-month-day display is adjusted to get, for example, "78:9:30", the light-emitting board 22a of the data recording light-emitting unit 22 forms the same optical image "78:9:30: as above display. The brightness of the optical image is adjusted to match the sensitivity of the film when the ASA sensitivity switch is set at that of the film is use. Next, when the camera's release button is depressed to close either X or FP synchroflash contact, the light-emitting diode board 22a is actuated to photograph the image of "78:9:30" on the film.

When the pushbutton 15-1 is depressed once more, the fourth time, the mode is switched to the hour-minute-second and the digits to show hour will blink. Each time the pushbutton 15-2 is depressed the display is updated by one hour. Similarly, depressing the pushbutton at the fifth time and sixth time will bring the digits to show minute and those to show second to be adjustable.

The foregoing is the description of how the optical data recording is performed. Next comes the description that several exposures are automatically made at predetermined intervals by means of the motor drive device. The hour-minute-second mode is settled by depressing the data mode switch button. The pushbutton 15-5 is depressed to allow the setting of the starting time of the motor drive exposures by depressing the pushbuttons 15-1, 15-2, 15-3 and 15-4. When the pushbutton 15-5 is depressed once more, the indication on the liquid-crystal display device 13a disappears. When the pushbutton 15-2 is depressed, a numeral representing the number of repeated depressions of the pushbutton 15-2 is displayed on the liquid-crystal display 13 at the location denoted as "78" in the figure. When the pushbutton is depressed two times, "2" is displayed there, indicating that photographing is made at two-minute intervals. Similarly, when the pushbutton 15-3 is depressed, a numeral representing the number of the depressions is displayed at the location noted as "9." For example, if the number is 10, then it indicates to take photographs 10 times. The displays "2" and "10" indicate that photographs are taken 10 times at two-minute intervals. After setting the operation program in this manner, the current time is again displayed on the liquid-crystal display device 13a when the pushbutton 15-5 is depressed. Under this condition, when the present starting time of motor driven photographing is reached, ten consecutive photographings will be made at two-minute intervals automatically. At this time, the numeral representing the changing current time is photographed on the film 32 by means of the light-emitting unit 22 for data recording, in synchronism with the shutter release of the camera. If the above data recording is unnecessary, the data mode switch button should be so depressed as to select the no-data-recording mode making the light-emitting unit idle or non-operative.

Figure 10:
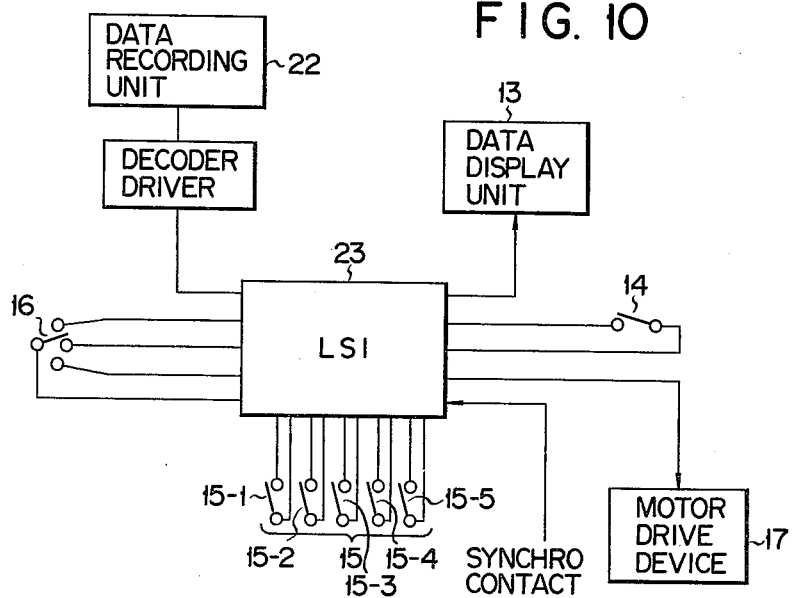
FIG. 10 shows a block circuit diagram of the data recordable camera.
Figure 11:
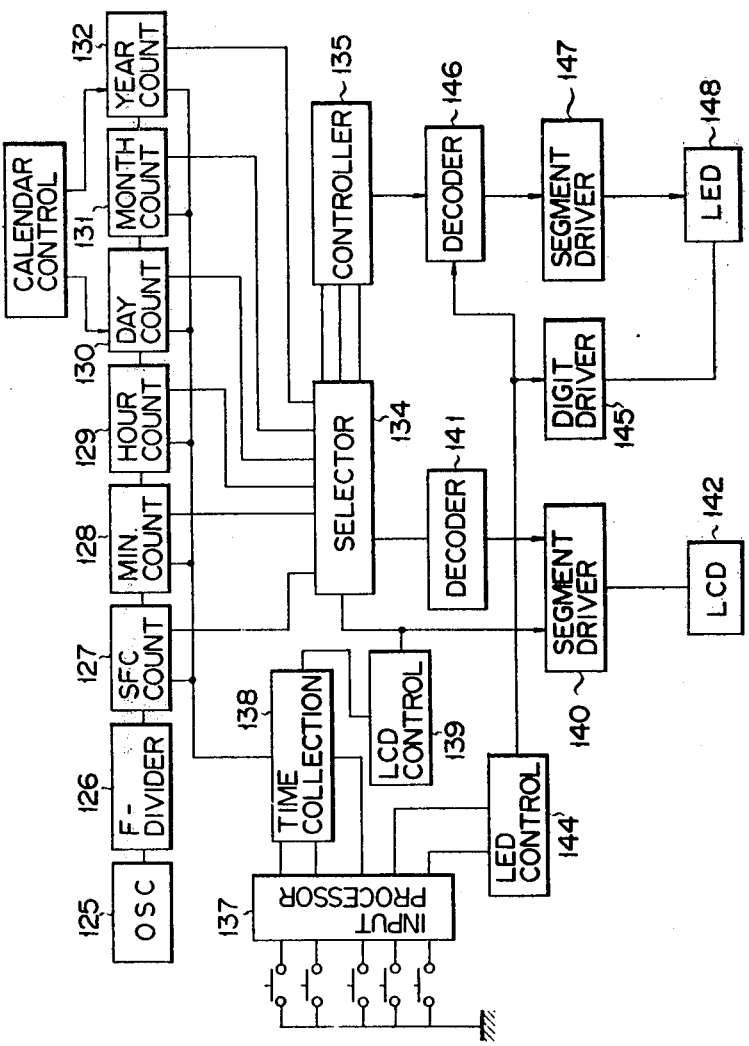
Figure 18:
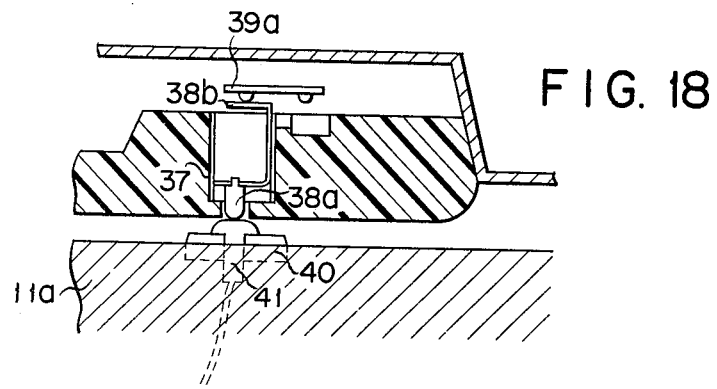

Turning now to FIG. 11, there is shown a circuit diagram of the circuit shown in FIG. 10. In the circuit, an oscillator 125 employs a crystal resonator as its source of oscillation and produces a pulse signal with a stable frequency which in turn is applied to a frequency divider 126 whereby its frequency is divided into 1 Hz. The pulse of 1 Hz is supplied to a second counter 127 whereby it is counted. The counter 127 is a scale of 60 counter which produces an output signal when it counts 60. The output signal of the second counter 127 is applied to a minute counter 128 which counts the output signal from the second counter 127. When its counting reaches 60 counts of the output signal, the counter 128 produces an output signal for transfer to an hour counter 129. Thus, the hour counter 129 is a scale of 24 counter ($12 \times 2$); a day counter 130 a scale of 31; a month counter 131 a scale of 12; a year counter 132 a scale of 100 ($10^2$). The contents of those counters are applied to a selector circuit 134. In response to a selection signal from the control circuit 139 for LCD lighting, the selector circuit 134 selects the contents of the counter 127 to 137, i.e. data relating to year, month, and day, or hour, minute, and second and transfers the selected one to a decoder 141. The count data from the selector 141 is converted by the decoder 141 into 7-segment signals which in turn drives the LCD 142 through the LCD segment driver circuit 140.

When the date data such as year, month and day, are photographed on the film, the count data from the year, month, and day counters 132, 131 and 130 are sequentially selected by the selector circuit 134 and transfers the selected one through a controller 135 to a decoder 146. The count data decoded is transferred through the LED segment driver 147 to a LED 148 thereby to drive it. In this case, the digits of the LED 148 are actuated by digit drive signals from an LED digit driver 145 to glow while numerals corresponding to year, month and day are photographed on the film.

Description will be given of how the motor drive device automatically photographs. In this case, the pushbutton 15-5 is depressed to bring the output Q of a flip-flop 150 to an H level. Under this condition, when the pushbutton 15-2 is depressed two times, for example, the counter 151 counts 2. The count data of the counter 151 is transferred through a gate 152 and an OR gate 153 to the decoder 146. As a result, the count data of the counter 151 is displayed on the LED 148. Then, if the pushbutton 15-3 is depressed ten times, for example, the counter 154 counts 10 and transfers the count of 10 to the decoder 146 through an OR gate 153. Finally, it is displayed by the LED 148. In this way, "2" and "10" are displayed by the LED 148. The output signals from the counters 151 and 154 are applied to a motor drive control circuit 155 containing counters, comparators and the like which responds to a pulse from the frequency divider 126 to produce ten control signals at two-minute intervals. In response to the control signals, a motor drive device shown in FIG. 13 performs ten release operations at two-minute intervals. Each of the control signals exchanges an electronic switch to connect a motor to a release circuit and then to connect the motor to a film winding circuit.

As seen from the foregoing, the operations of the data recording and/or motor drive photographing are performed through selecting operation of the pushbutton. Incidentally, a signal to control the motor drive device is transferred through the motor drive control terminal 18 and the synchroflash plug 20.

In the embodiment described above, the synchronizing signal is supplied through a synchroflash cord with a synchroflash plug regardless of the presence or not of the direct contact for synchronizing.

Figure 14:
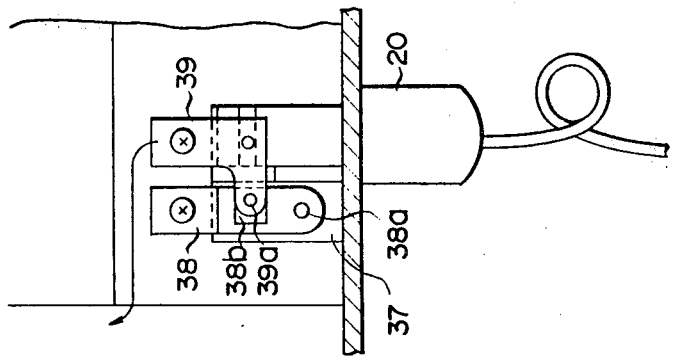

Turning now to FIGS. 14 to 18, there is shown an example of synchroflash socket usable for a camera with a direct contact and the one with no direct contact as well. Such as synchroflash terminal socket is provided with another groove 37 next to the synchroflash socket groove 21a in the base board 24. A direct contact spring 38 is provided in the groove 37 as shown in FIG. 14. The direct contact spring 38 has a contact pin 38a and a contact piece 38b protruding from the base board 24. A contact member 39 disposed over the socket groove 21a has a contact piece 39a extending to the contact piece 38b of the direct contact spring 38. When the synchroflash socket is used in a camera without the direct contact, the conductive member 20a of the synchroflash plug 20 is inserted into the socket groove 21a and, upon the insertion, the contact member 39 is connected to the conductive member 20a, as shown in FIG. 17, is raised by the conductive member 20a, departing from the contact member 38b of the direct contact spring 38. Therefore, the synchronizing signal is supplied only through the synchroflash plug 20.

On the other hand, when the synchroflash socket is used in a camera with the direct contact, the contact pin 38a of the direct contact spring 38 comes in contact with the direct contact 41 mounted on a camera body 11a with an insulating member 40 intervening therebetween. At this time, the contact pin 38a is pushed in a direction of a groove 37, so that the contact member 38b of the direct contact spring 38 comes in contact with the contact piece 39a thereby to push up the contact member 39 in cooperation with the contact piece 39a. With such a construction, the synchronizing signal is supplied through the direct contact 41, the direct contact spring 38 and the contact 39. When the socket is used for the camera with the direct contact, no synchroflash cord is needed, thus improving the operability of the camera.

Figure 19:
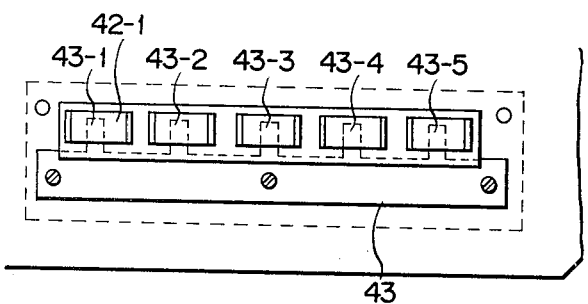
FIGS. 19 to 21 show a plan view, a cross sectional view and a longitudinal sectional view of the pushbuttons.
Figure 20:
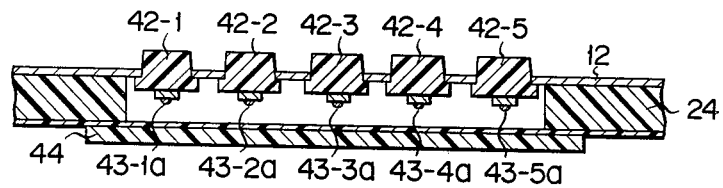
Figure 21:
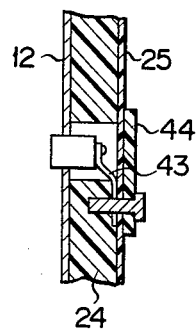

In the above-mentioned embodiments, the pushbutton group is formed in the integral form by using elastic material. The pushbutton group may also be constructed as shown in FIGS. 19 to 21. As shown, five buttons 42-1 to 42-5 made of plastic are disposed in pushbutton holes of the back cover 12 and raised by the contacts pieces 43-1 to 43-5 facing the pushbuttons as part of the flat spring mounted on the base board 24. Nibs 43-1a to 43-5a provided on the contact pieces 43-1 to 43-5 are located corresponding to the respective pattern portions of a flexible printed board 25. Those portions of the printed pattern facing those nibs are supported by reinforcing members 44. With this construction, the nibs of the contact pieces of the flat spring touch the corresponding portions of the contact pattern when the pushbuttons are depressed, so that the required transfer of signals will be made.

As described above, the present invention provides cameras of high quality and commercial value capable of optical data recording and motor drive operation programming with a relatively simple construction and easy manipulation. The power supply in the preferred embodiment of this invention comprises two separate ones; one for the camera operation control (including that for shutter release solenoid circuit) and the other for the data recording/display circuit and the programming circuit. It is evident, however, that a single power supply may be used for those circuits. In this single power supply arrangement, it is necessary to avoid the light emission of the light-emitting unit for data recording while the control circuit of the camera proper consumes current. To this end, the signal to initiate the data recording rather than the strobe light synchronization signal is transferred when the current consumption of the camera operation control circuit reaches its minimum after completion of the film exposure. This can be realized by providing a switch that produces a signal to initiate the data recording immediately after completion of the film exposure. The control system for the data recording, the display device, and the motor drive operation programming, which is mounted on the back cover of the camera in the above-mentioned embodiments, may be mounted on the main frame of the camera. Moreover, the camera may be used as a camera with the optical data recording capability because its motor drive device can be easily detached from the camera.

What we claim is:

1. A data recordable camera comprising:
   data producing means for producing at least a time data and a timing data;
   data recording means for converting the time data from said data producing means into an optical image to exposure a film;
   data display means for displaying selectively the time data and timing data from said data producing means; and
   means for transferring the timing data from said data producing means to a motor drive device whereby the motor drive device is driven at a timing of the timing data.

2. A data recordable camera according to claim 1, wherein said data producing means is a timer circuit for producing time data corresponding to at least second, minute, and hour, and day, month and year.

3. A data recordable camera according to claim 1, wherein said timing data includes data representing a motor drive start timing, a photographing interval and a number of photographings.

4. A data recordable camera according to claim 1, wherein said data recording means is comprised of a light-emission unit with a plurality of light emission diodes disposed close to a film.

5. A data recordable camera according to claim 1, wherein said data producing means includes a plurality of operation switches, means connected to a plurality of switches to produce an output signal corresponding to an operating condition of those operating switches, a timer circuit for producing time data corresponding to at least second, minute, hour, day, month and year, and means connected to said timer circuit and said switch operating condition signal producing means and for selecting from the time data of said timer circuit time data corresponding to the output signal from said switch operating condition signal producing means.

6. A data recordable camera comprising:
   a back cover, a board attached to the inside of said back cover, a large scale integrated circuit device including a data producing circuit to produce at least a time data and attached to said board, a data recording unit attached to said board for converting the time data produced from said data producing circuit into an optical image to expose a film, a display unit attached to said board for displaying selectively the time data and timing data from said data producing circuit, and a plurality of operation switches so provided on said board as to operate said switches from said back cover and connected to said integrated circuit device, a terminal portion for leading the data from said integrated circuit device to a motor drive device, wherein said integrated circuit device includes a circuit for producing a timing set signal to set the operation timing of said motor drive device in accordance with an operation condition of said operation switches, and a circuit for producing a signal for driving said motor drive device in response to the timing set signal from said timing setting signal producing circuit and the time data from said data producing circuit.

7. A data recordable camera according to claim 6, wherein said operation switches are comprised of a plurality of pushbuttons integrally formed of resilient member, a plurality of metal plates formed on the bottom surfaces of said pushbuttons, and conductive contact pieces provided facing to said metal plates.

* * * * *